United States Patent
Smith

(10) Patent No.: US 8,003,268 B2
(45) Date of Patent: Aug. 23, 2011

(54) MODULAR REGENERATIVE FUEL CELL SYSTEM

(76) Inventor: William F. Smith, Suffield, CT (US)

( * ) Notice: Subject to any disclaimer, the term of this patent is extended or adjusted under 35 U.S.C. 154(b) by 1517 days.

(21) Appl. No.: 11/390,593

(22) Filed: Mar. 28, 2006

(65) Prior Publication Data

US 2006/0222912 A1    Oct. 5, 2006

Related U.S. Application Data

(60) Provisional application No. 60/667,392, filed on Mar. 31, 2005.

(51) Int. Cl.
    *H01M 8/18* (2006.01)
    *H01M 8/24* (2006.01)
    *H01M 8/04* (2006.01)

(52) U.S. Cl. .................... 429/418; 429/513

(58) Field of Classification Search ............ 429/21, 429/418
See application file for complete search history.

(56) References Cited

U.S. PATENT DOCUMENTS

| | | | |
|---|---|---|---|
| 6,218,035 B1 | 4/2001 | Fuglevand et al. |
| 6,248,461 B1 | 6/2001 | Abe et al. |
| 6,251,534 B1 | 6/2001 | McElroy |
| 6,280,865 B1 | 8/2001 | Eisman et al. |
| 6,316,134 B1 | 11/2001 | Cownden et al. |
| 6,387,556 B1 | 5/2002 | Fuglevand et al. |
| 6,428,918 B1 | 8/2002 | Fuglevand et al. |
| 6,458,477 B1 | 10/2002 | Hsu |
| 6,495,277 B1 | 12/2002 | Edlund et al. |
| 6,497,974 B2 | 12/2002 | Fuglevand |
| 6,503,649 B1 | 1/2003 | Czajkowski et al. |
| 6,579,638 B2 | 6/2003 | Brassard |
| 6,613,215 B2 | 9/2003 | Molter et al. |
| 6,652,732 B2 | 11/2003 | Moulthrop et al. |
| 6,653,011 B2 | 11/2003 | Dristy |
| 6,810,925 B2 | 11/2004 | Graham et al. |
| 6,833,207 B2 | 12/2004 | Joos et al. |
| 6,835,483 B2 | 12/2004 | Ballantine et al. |
| 6,887,601 B2 | 5/2005 | Moulthrop, Jr. et al. |

(Continued)

FOREIGN PATENT DOCUMENTS

JP      06 163064 A      6/1994

(Continued)

OTHER PUBLICATIONS

Baldwin, R. et al., "Hydrogen-Oxygen Proton-Exchange Membrane Fuel Cells and Electrolyzers", Space Electrochemical Research and Technology Abstracts, NTIS No. N8922982 (NASA No. CP-10329), 1989, pp. 19-20, Nasa Lewis Research Center, Cleveland.

(Continued)

*Primary Examiner* — Patrick Ryan
*Assistant Examiner* — Brent Thomas
(74) *Attorney, Agent, or Firm* — Holland & Bonzagni, P.C.; Mary R. Bonzagni, Esq.

(57) ABSTRACT

A modular, regenerative fuel cell system that includes a plurality of dedicated or reversible electrochemical cell stack modules, where each such module is devoid of major fluid systems, is provided. The inventive system allows a user to specifically and effectively tailor the system to the demands of a particular application. If additional electrolysis capability and/or additional power are needed, only electrolysis cell stack modules and/or fuel cell stack modules are added to the system. The use of unnecessary or duplicative support equipment is avoided thereby rendering this system more cost effective and efficient.

18 Claims, 3 Drawing Sheets

U.S. PATENT DOCUMENTS

| | | | |
|---|---|---|---|
| 2002/0102446 | A1 | 8/2002 | Rich, Sr. |
| 2003/0022037 | A1 | 1/2003 | Parr et al. |
| 2003/0022038 | A1 | 1/2003 | Vaal et al. |
| 2003/0035983 | A1 | 2/2003 | Ukai et al. |
| 2003/0170516 | A1* | 9/2003 | Prerad ............................. 429/21 |
| 2003/0215680 | A1* | 11/2003 | Lillis et al. ...................... 429/21 |
| 2005/0008923 | A1* | 1/2005 | Malhotra ........................ 429/38 |
| 2005/0083168 | A1* | 4/2005 | Breitenbach .................. 337/380 |
| 2005/0100766 | A1* | 5/2005 | Bach ............................... 429/12 |
| 2005/0136301 | A1* | 6/2005 | Knaggs et al. .................. 429/22 |
| 2006/0188763 | A1* | 8/2006 | Bai et al. ......................... 429/22 |

FOREIGN PATENT DOCUMENTS

| | | |
|---|---|---|
| JP | 06 276701 A | 9/1994 |
| JP | 09 199155 A | 7/1997 |
| WO | WO 03/107508 A2 | 12/2003 |

OTHER PUBLICATIONS

Clifford, J. E., et al., "Evaluation of a Water-Battery Energy-Storage Concept for an Electric Utility System" Battelle Energy Program Report, NITS No. PB288981, Jun. 1975, Battelle Columbus Laboratories, Columbus.

Coker, T. G., et al., "Industrial and Government Applications of SPE Fuel Cell and Electrolyzers", paper presented at The Case Western Symposium on "Membranes and Ionic and Electronic Conducting Polymer", May 17-19, 1982, Cleveland.

Colella, Nicholas J., et al., "Pathfinder and the Development of Solar Rechargeable Aircraft", E & TR, Jul. 1994, pp. 1-9.

ESA Contract Information, www.estec.esa.nl/thermal/contracts/number7561.html, 1988.

Faymon, K. A., et al., "Space Power Technology into the 21st Century", Space Power Systems Technology, NTIS No. N8426746 (NASA No. TM-83690), 1983, American Institute of Aeronautics and Astronautics, Costa Mesa.

Gross, S., "Analysis of Regenerative Fuel Cells", NTIS No. N8413671 (NASA No. CR-171783) Nov. 1982, NASA Lyndon B. Johnson Space Center, Houston.

Hoberecht, M. A., et al., "Design Considerations for a 10-kw Integrated Hydrogen-Oxygen Regenerative Fuel Cell System", Nineteenth Intersociety Energy Conversion Engineering Conference, NTIS No. N8423023 (NASA No. TM-83664), 1984, ANS, ASME, SAE, IEEE, AIAA, ACS, and AIChE, San Francisco.

Manzo, M. A., et al., "A 37.5-kw Point Design Comparison of the Nickel-Cadmium Battery, Bipolar Nickel-Hydrogen Battery, and Regenerative Hydrogen-Oxygen Fuel Cell Energy Storage Subsystems for Low Earth Orbit", Nineteenth Intersociety Energy Conversion Engineering Conference, NTIS No. N8423022 (NASA No. TM-83651), 1984, ANS, ASME, SAE IEEE, AIAA, ACS, and AIChE. San Francisco.

Marshall, Marc, "The Schatz Solar Hydrogen Project", www.humboldt.edu/~solarh2cvcle.html, Humboldt State University, 2003.

Martin, R. E., "Electrochemical Energy Storage for an Orbiting Space Station", NTIS No. N8217607 (NASA No. CR-165436), Dec. 1981, NASA Lewis Research Center, Cleveland.

Martin, R. E. et al., "Regenerative Fuel Cell Energy Storage System for a Low Earth Orbit Space Station", NTIS No. N8830184 (NASA No. (R-174802), 1988, NASA Lewis Research Center, Cleveland.

McElroy, J. F. (director), "Solid Polymer Electrolyte (SPE) Fuel Cell Technology Program", NTIS No. N7921622 (NASA No. CR-160159), Mar. 1979, NASA Lyndon B. Johnson Space Center, Houston.

McElroy, J. F., "SPE® Regenerative Hydrogen/Oxygen Fuel Cells for Extraterrestrial Surface and Microgravity Applications", paper presented at NASA's Technology for Space Station Evolution Workshop, NTIS No. N9327803, Jan. 16-19, 1990.

Regenerative Fuel Cell Energy Storage, www.grc.nasa/WWW/ERAST/rfc2.html, 2003.

Smith, W., "The Role of Fuel Cells in Energy Storage", Journal of Power Sources, 2000, pp. 74-83, vol. 86, Elsevier Sciences S. A.

Stromme, Lisa, "The Solar Hydrogen Cycle", www.humboldt.edu/~solarh2cvcle.html, Humboldt State University, 2003.

* cited by examiner

MODULAR REGENERATIVE FUEL CELL SYSTEM

RELATED APPLICATION

This application claims priority from U.S. Provisional Patent Application Ser. No. 60/667,392, filed Mar. 31, 2005.

FIELD OF THE INVENTION

The present invention generally relates to a power generation and energy storage system, and more particularly relates to a modular regenerative fuel cell system.

BACKGROUND AND SUMMARY OF THE INVENTION

Regenerative fuel cell systems in which one or more electrochemical cells are utilized to both electrolyze water to produce hydrogen and oxygen, and to produce electricity by converting hydrogen and oxygen back into water, are known. These systems, which may be used with either renewable or non-renewable, grid connected or off-grid power sources, offer a means for storing energy to be used during periods when primary power from one of these sources is unavailable, and are constructed as either unitary or modular structures, with the modular design allowing for flexibility in, among other things, shipping, installation, power output, run time, recharge time and system modification (e.g., upgrading, increasing capacity).

The system architecture for the modular regenerative fuel cell systems, which is best shown in FIG. 1, place hydrogen generation, hydrogen storage, and fuel cell power generating functions in separate modules. These modular systems, which are packaged as either floor mounted or rack mounted systems, employ electrolysis cell subsystems 1, fuel cell subsystems 2, as well as hydrogen storage subsystems 3, with each electrolysis and fuel cell subsystem including a cell stack and associated fluid systems and power conditioning. During charge operation, water is introduced to the electrolysis cell subsystem 1, where it is electrolyzed to form hydrogen gas and oxygen according to the reaction $2H_2O \rightarrow 2H_2 + O_2$. The hydrogen gas produced in electrolysis cell subsystem 1 is stored in the hydrogen storage subsystem 3, while the oxygen may be either vented to ambient air or stored. During power generation operation, the hydrogen gas stored in subsystem 3 flows to the fuel cell subsystem 2, where it reacts with oxygen supplied from either the air or storage to generate electricity and to yield product water.

For applications requiring additional electrolysis or power capability, complete subsystems are added to these prior art modular regenerative fuel cell systems. Such an approach, however, may result in sub-optimal matching of either charge or discharge capability and in redundant equipment.

By way of the present invention, it has been discovered that partitioning the electrolysis cell and fuel cell subsystems into separate stack and fluid modules allows a user to specifically and effectively tailor the system to the demands of a particular application.

The present invention therefore generally provides a modular, regenerative fuel cell system that comprises a plurality of reversible or dedicated electrochemical cell stack modules, wherein each such module is devoid of major fluid systems.

In a preferred embodiment, the present invention provides a modular, regenerative fuel cell system that comprises:
(a) one or more of each of the functional modules listed in either group (i) or group (ii) below:
  (i) reversible fuel cell stack modules, and fluid modules; or
  (ii) electrolysis cell stack modules, electrolysis cell fluid modules, fuel cell stack modules, and fuel cell fluid modules, and
(b) means for storing hydrogen gas.

In a first more preferred embodiment, the modular, regenerative fuel cell system of the present invention employs reversible modules ("the reversible module system") and comprises:
(a) one or more reversible fuel cell stack modules, each in fluid communication with at least one fluid module, and in electrical communication with a power source, an external load or power grid, and control means, and each being adapted to convert water, water vapor, or an aqueous solution into at least a hydrogen gas, and to extract chemical energy from hydrogen gas and air or oxygen and convert the extracted chemical energy into electrical power;
(b) one or more fluid modules in fluid communication with (i) a source of water, water vapor, or aqueous solution, (ii) means for storing hydrogen gas, (iii) a source of air or oxygen, and (iv) the one or more reversible fuel cell stack modules, and in electrical communication with a power source and control means, for providing water, water vapor, or aqueous solution, hydrogen gas, and air or oxygen to the one or more reversible fuel cell stack modules, and for delivering hydrogen gas generated by the one or more reversible fuel cell stack modules to the means for storing hydrogen gas;
(c) a power source;
(d) control means; and
(e) means for storing hydrogen gas.

In a second more preferred embodiment, the modular, regenerative fuel cell system of the present invention employs dedicated modules ("the dedicated module system") and comprises:
(a) one or more electrolysis cell fluid modules in fluid communication with (i) a source of water, water vapor, or aqueous solution, (ii) one or more electrolysis cell stack modules, and (iii) means for storing hydrogen gas, and in electrical communication with a power source and control means, for providing water, water vapor, or an aqueous solution to the one or more electrolysis cell stack modules and for delivering hydrogen gas generated by the one or more electrolysis cell stack modules to the means for storing hydrogen gas;
(b) one or more electrolysis cell stack modules in fluid communication with the one or more electrolysis cell fluid modules, and in electrical communication with the power source and the control means, each being adapted to convert water, water vapor, or an aqueous solution into at least a hydrogen gas;
(c) one or more fuel cell fluid modules in fluid communication with (i) the means for storing hydrogen gas, (ii) a source of air or oxygen, and (iii) one or more fuel cell stack modules, and in electrical communication with the power source and the control means, for providing hydrogen gas and air or oxygen to the one or more fuel cell stack modules;
(d) one or more fuel cell stack modules, each in fluid communication with the one or more fuel cell fluid modules, and in electrical communication with the power source, an external load or power grid, and the control means, and each being adapted to extract chemical energy from the hydrogen gas and air or oxygen and converting the extracted chemical energy into electrical power;

(e) a power source;
(f) control means; and
(g) means for storing hydrogen gas.

In yet a more preferred embodiment, the power source constitutes: a power means for (i) receiving power from an energy source, (ii) optionally charging one or more batteries, (iii) providing power to either the one or more reversible fuel cell stack modules and the one or more fluid modules of the reversible module system, or the one or more electrolysis cell fluid modules, the one or more electrolysis cell stack modules, and the one or more fuel cell fluid modules of the dedicated module system, and (iv) converting variable power from the one or more reversible or dedicated fuel cell stack modules to constant or relatively constant voltages and/or inverting direct currents to alternating currents; and/or one or more batteries, and the inventive modular regenerative fuel cell system further comprises: monitoring means for monitoring information regarding all aspects of the modular regenerative fuel cell system and for transmitting the information to the control means of the modular regenerative fuel cell system.

The inventive system, in a most preferred embodiment, is selected from the group of modular regenerative Proton Exchange Membrane (PEM) fuel cell systems, modular regenerative Solid Oxide fuel cell (SOFC) systems, modular regenerative Alkaline fuel cell systems, modular regenerative Phosphoric Acid fuel cell systems, modular hydrogen-halogen fuel cell systems, and combinations thereof.

The present invention further provides a method for generating power and storing energy using a modular, regenerative fuel cell system, which method comprises configuring the fuel cell system to include a plurality of reversible or dedicated electrochemical cell stack modules, wherein each such module is devoid of major fluid systems.

Other features and advantages of the invention will be apparent to one of ordinary skill from the following detailed description and drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

In the course of the description which follows, reference is made to the drawings, in which.

BEST MODE FOR CARRYING OUT THE INVENTION

The preferred modular regenerative fuel cell system of the present invention offers a variety of modules, each directed toward a different system function. As such, the inventive system allows a user to specifically and effectively tailor the system to the demands of a particular application. If additional electrolysis capability and/or additional power are needed, only electrolysis cell stack modules and/or fuel cell stack modules are added to the system. The use of unnecessary or duplicative support equipment is avoided rendering the system more cost effective and efficient. Moreover, the inventive system offers a number of packaging options including a wall mounting packaging option in addition to floor and rack mounting options.

Figure 1:
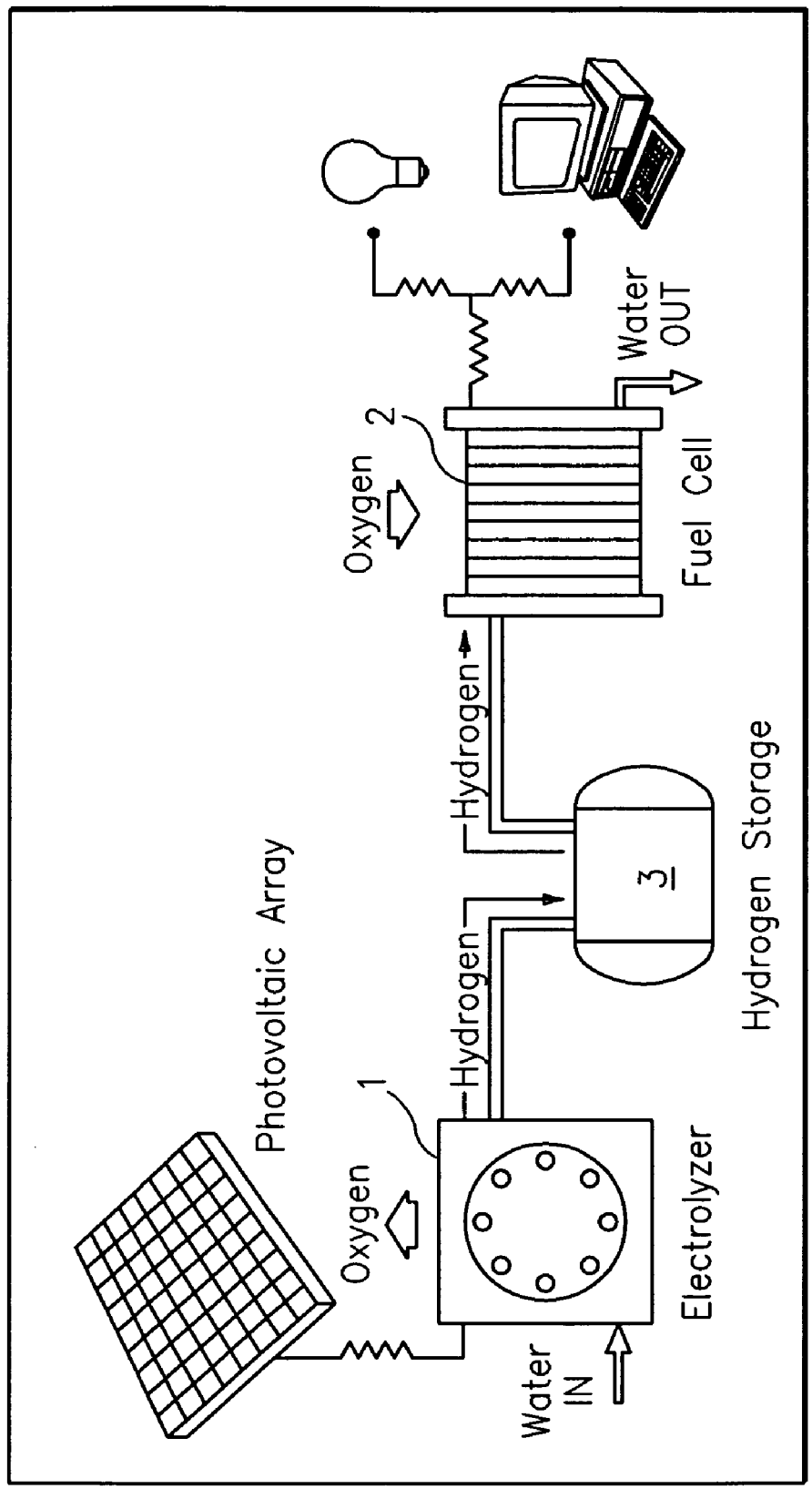
FIG. 1 is a schematic diagram of a prior art, modular, regenerative fuel cell system.
Figure 2:
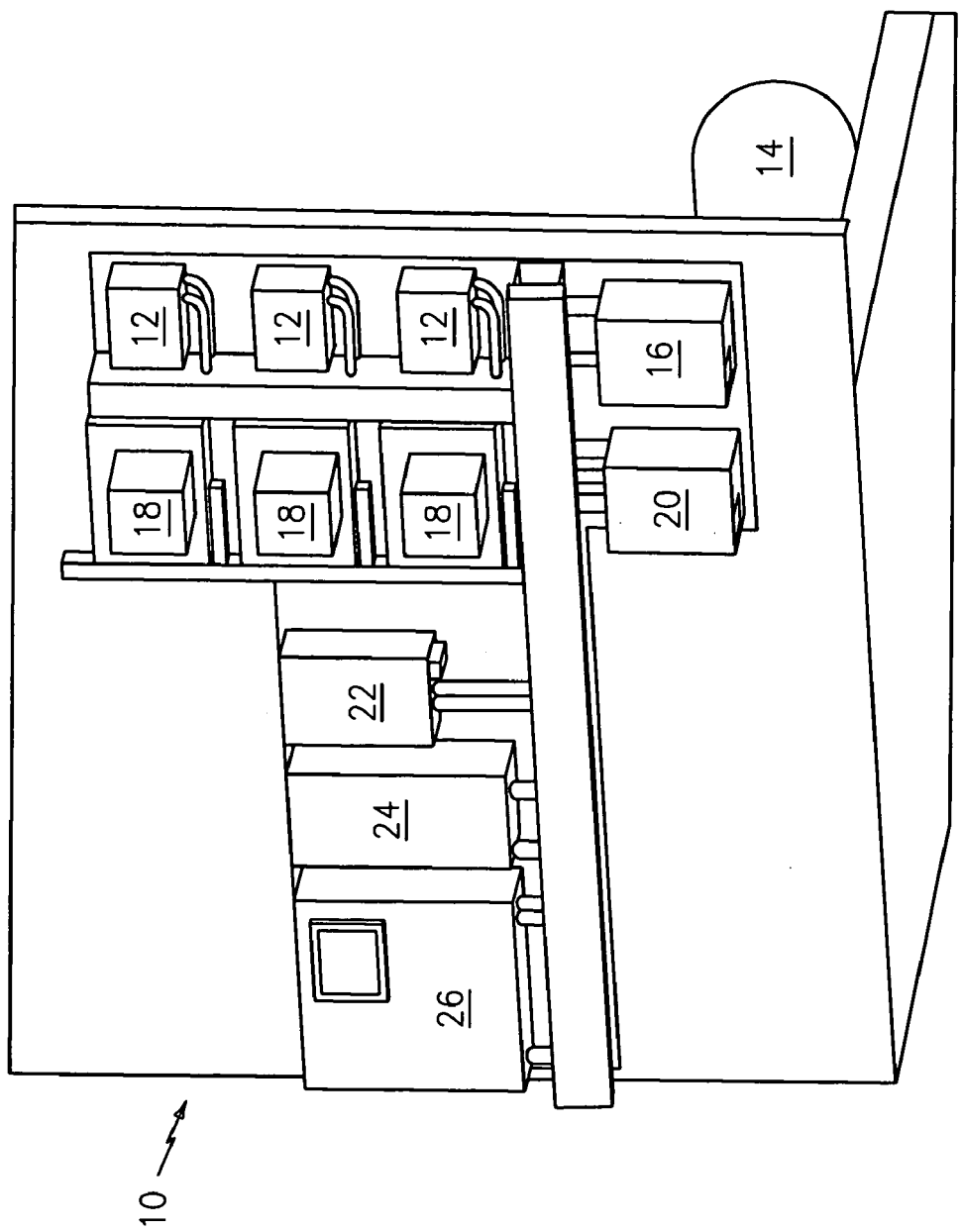
FIG. 2 is a block schematic diagram of a more preferred embodiment of the modular regenerative fuel cell system of the present invention.

Referring now to FIG. 2, a more preferred embodiment of the modular regenerative fuel cell system of the present invention is shown generally at 10. System 10, which is rack-mounted, basically comprises:

(a) electrolysis cell stack modules 12, each in fluid communication with an electrolysis cell fluid module 16, and in electrical communication with power means 24 and control means 26, each being adapted to convert water, water vapor, or an aqueous solution into at least a hydrogen gas;

(b) a hydrogen gas storage tank 14;

(c) an electrolysis cell fluid module 16 in fluid communication with (i) a source of water, water vapor, or aqueous solution (not shown), (ii) the electrolysis cell stack modules 12, and (iii) the hydrogen gas storage tank 14, and in electrical communication with the power means 24 and control means 26, for providing water, water vapor, or an aqueous solution to the electrolysis cell stack modules 12 and for delivering hydrogen gas generated by the electrolysis cell stack modules 12 to the hydrogen gas storage tank 14;

(d) fuel cell stack modules 18, each in fluid communication with a fuel cell fluid module 20, and in electrical communication with power means 24, control means 26, and an external load or power grid (not shown), each being adapted to extract chemical energy from hydrogen gas and air or oxygen and convert the extracted chemical energy into electrical power;

(e) a fuel cell fluid module 20 in fluid communication with (i) the hydrogen gas storage tank 14, (ii) a source of air or oxygen (not shown), and (iii) the fuel cell stack modules 18, and in electrical communication with power means 24 and control means 26, for providing hydrogen gas and air or oxygen to the fuel cell stack modules 18;

(f) one or more batteries 22;

(g) power means 24 for (i) receiving power from an energy source (e.g., a generator system, photovoltaics, wind turbine or any other conventional or newly developed source) (not shown), (ii) optionally charging the one or more batteries 22, (iii) providing power to the electrolysis cell fluid module 16, the electrolysis cell stack modules 12, and the fuel cell fluid module 20, and (iv) converting variable power from the fuel cell stack modules 18 to constant or relatively constant voltages and/or for inverting direct currents to alternating currents;

(h) monitoring means (not shown for monitoring information regarding all aspects of the modular regenerative fuel cell system 10 and for communicating such information to the control means 26; and (i) control means 26 for receiving information from the monitoring means and for controlling all aspects of the modular regenerative fuel cell system 10, thereby assuring continuous, uninterrupted system operation.

System 10 contains a number of individual electrochemical cells arranged in stacks, with the working fluids directed through the cells via input and output conduits formed within each stack structure. As noted above, these cell stacks are preferably dedicated cell stacks that are used within system 10 to either electrolyze water (or an aqueous solution) to produce hydrogen and oxygen (electrolysis cell stack modules 12), or to produce electricity by converting hydrogen and oxygen back into water (fuel cell stack modules 18), as needed. These cell stacks, however, may also be reversible cell stacks that serve to both electrolyze water (or an aqueous solution) and produce electricity.

The one or more electrolysis cell stack modules 12 are in fluid communication with one or more electrolysis cell fluid modules 16, and in electrical communication with power means 24 and control means 26, while the one or more fuel cell stack modules 18 are in fluid communication with one or more fuel cell fluid modules 20, and in electrical communication with power means 24, an external load or power grid, and control means 26.

As is well known to those skilled in the art, electrolysis cells and fuel cells are basically energy conversion devices and include liquid electrolyte cells and solid, liquid, or membrane electrolyte cells. Electrolysis and fuel cells are structurally similar, but are utilized to effect different half-cell reactions.

In a preferred embodiment, the cell stack modules employed within system 10 contain membrane electrolysis cells and membrane fuel cells that generally comprise an anode, a cathode, an ion exchange membrane disposed there between, for providing ion exchange between the cathode and the anode electrodes, an anode chamber and a cathode chamber. In order to assure that half-cell reactions that take place at the anode and cathode move forward at useful rates, catalyst materials may be incorporated into these cells.

As alluded to above, preferred membrane electrochemical cells of system 10 are selected from the group of PEM cells and solid oxide cells.

The electrolysis cell stack module(s) 12 preferably has the ability to self pressurize. In specific regard to PEM and solid oxide cell stack modules, hydrogen pressurization may be achieved by, for example, electrochemical pumping of hydrogen ions across the membranes to the cathodes where hydrogen gas evolves until a pre-set pressure limit is reached, while oxygen pressurization may be achieved by back pressuring the oxygen gas evolving at the anodes. As will be readily appreciated by those skilled in the art, such pressurization processes may be used in both dedicated and reversible cells and cell stacks.

The electrolysis cell stack module(s) 12 of the present invention may produce hydrogen gas at rates ranging from less than about 0.1 standard cubic feet per hour (SCFH) (0.05 standard liters per minute (SLPM)) to more than about 30,000 SCFH (14,160 SLPM).

Power generated by the fuel cell stack module(s) 18 of the present invention may range from less than several watts to over 1000 kilowatts.

The electrolysis cell fluid module(s) 16 of system 10 is in fluid communication with (i) a source of water, water vapor, or aqueous solution, (ii) the electrolysis cell stack module(s) 12; and (iii) hydrogen gas storage means (e.g., the hydrogen gas storage tank 14, and is in electrical communication with power means 24 and control means 26. Fluid module(s) 16 provides liquid or vapor phase water (or aqueous solution) to the electrolysis cell stack module(s) 12, receives product gases and waste heat from the electrolysis cell stack module(s) 12 that are generated during electrolysis, separates the hydrogen gas from the oxygen gas and waste heat, and then directs the separated hydrogen gas to the hydrogen gas storage means (e.g., the hydrogen gas storage tank 14). Each such fluid module 16 basically comprises one or more pumps, valves, regulators, water/gas phase separation devices, and temperature, pressure and hydrogen sensors.

The fuel cell fluid module(s) 20 of system 10 is in fluid communication with (i) the hydrogen gas storage means (e.g., the hydrogen gas storage tank 14), (ii) a source of air or oxygen, and (iii) fuel cell stack module(s) 18, and is in electrical communication with power means 24, and control means 26. Fluid module(s) 20 provides humidified hydrogen gas and air or oxygen to the fuel cell stack module(s) 18, and receives product water from the fuel cell stack module(s) 18. Each such fluid module 18 basically comprises hydrogen and air/oxygen fluid manifolds, a thermal control device, water management means, valves, regulators and safety and control sensors.

Fluid and electrical connections within system 10 are not limited and may be effected using conventional materials and connection means.

Power means 24, which includes power regulating and/or power inverting means, receives DC or AC voltage from an energy source such as a generator system, photovoltaics, wind turbine or any other conventional or newly developed source and optionally converts a portion of the power to voltage for charging one or more batteries 22. Power means 24 may be used alone or in combination with the battery(ies) 22 to power the one or more electrolysis cell stack modules 12, the one or more electrolysis cell fluid modules 16, and the one or more fuel cell fluid modules 20. Alternatively, the electrolysis cell stack modules 12 may be connected directly to the battery(ies) 22. Power means 24 also receives DC voltage generated by the one or more fuel cell stack modules 18, which may also be used to charge the one or more batteries 22.

The fuel cell stack module(s) 18 will typically produce direct current at a voltage which varies according to the number of cells in the stack and the operating conditions of the cells. Applications for the power generated by these fuel cell stacks may demand constant voltage, or alternating current at a constant voltage and frequency similar to a municipal power grid, etc. Power means 24 accommodates such demands.

Technologies for converting variable direct current voltages to constant or relatively constant voltages are well known, as are technologies for inverting direct currents to alternating currents. Suitable power conditioner topologies for fuel cells are also well known. For example, the teachings of U.S. Pat. No. 6,581,015 are hereby incorporated by reference.

In a preferred embodiment, power means 24 comprises either a charge controller with optional maximum power point tracker (MPPT) and/or inverting capability, or an inverter with optional charging capability. In one such preferred embodiment, power means 24 is a DC to AC inverter/charger. Suitable inverter/chargers, which combine an inverter, battery charger and transfer switch in one package, are available from (1) Xantrex International SRL and Xantrex Technology BVI, Inc., Suite No. 3, Stafford House, The Garrison, St. Michael, Barbados, under the trade designation XANTREX SW Plus inverter/charger, and from (2) Outback Power Systems, Inc., 19009 $62^{nd}$ Avenue, Arlington, Wash. 98223, USA.

Control means 26 basically comprises at least system controller, which is programmed to oversee status, transactions, and processes of system 10. Specifically with respect to controlling the production of hydrogen gas by the one or more electrolysis cell stack modules 12, the system controller(s) enables, monitors, adjusts, and disables all aspects of the connections between: (i) power means 24 (e.g., a charge controller, or inverter), the electrolysis cell stack module(s) 12, and the electrolysis cell fluid module(s) 16; and (ii) the electrolysis cell fluid module(s) 16, the source of water, water vapor, or aqueous solution, the electrolysis cell stack module(s) 12, and the hydrogen gas storage means 14. Similarly, with respect to controlling the production of electrical power, the system controller(s) enables, monitors, adjusts, and disables all aspects of the connections between: (i) power means 24, the fuel cell fluid module(s) 20, and the fuel cell stack module(s) 18; and (ii) the fuel cell fluid module(s) 20, the hydrogen gas storage means 14, the source of air or oxygen, and the fuel cell stack module(s) 18. The system controller(s) will detect normal variations in module, stack, or subsystem performance and will automatically provide direct or indirect compensation for any such variation, thereby balancing old and new modules, as well as, modules having different technology, manufacturers, level/status, or the like.

The system controller also manages the modular replacement of components within the regenerative fuel cell system 10, and can be reconfigured for modular replacement of components and connection and disconnection of external service ports. The system controller can also control the operating mode of system 10 and place system 10 in a maintenance mode where the modular replacement is plug-and-play, to allow continuous operation.

The system controller may be a single controller that controls all the operations of system 10. Alternatively, multiple controllers may be provided to control different aspects of system 10 operation.

Monitoring means, which basically comprises monitoring instrumentation and a communication system, monitors information regarding aspects of the modular regenerative fuel cell system 10 and transmits the information to the control means 26 (e.g., the system controller(s)), which enables/disables or adjusts all aspects of the connections within system 10 in response thereto, thereby assuring continuous, uninterrupted operation.

Monitoring instrumentation is mounted on the functional modules of system 10 and elsewhere and provides information to the system controller(s) regarding particular attributes of the cell stacks and fluid modules and storage means including but not limited to the functional status, output, and/or fuel levels. This information may be routed via the communication system to an Internet site or other specific destination. The communication system is not limited and may be comprised of any number of analog or digital devices such as a personal computer, a local area network (LAN), or a relay station for wireless communication. The electrical output of the fuel cell stack module(s) 18 may be used to power such a system from a remote location, circumventing the need for an additional power supply to maintain the transmission of information on the status of system 10.

In a preferred embodiment, the communication system is a high-speed LAN, with each component of system 10 interfacing itself with the LAN through a wired or wireless LAN interface.

In another preferred embodiment, the communication system employs Radio Frequency Identification (RFID) tags that uniquely identify the components of system 10 and communicate with the system controller.

Figure 3:
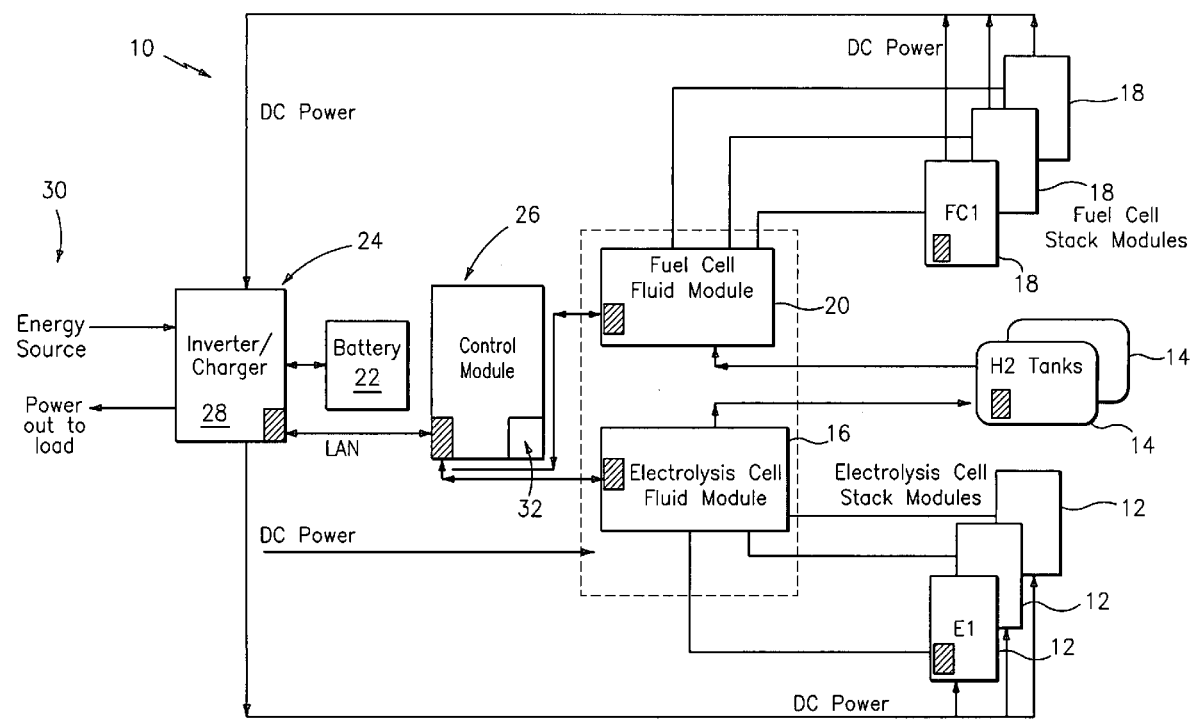
FIG. 3 is a block schematic flow diagram of the more preferred embodiment of the modular regenerative fuel cell system shown in FIG. 2.

In operation, and as best shown in FIG. 3, power means 24, in the form of an inverter/charger 28, receives power from energy source 30. Upon receiving a signal from the control means 26, inverter/charger 28 will switch to charger operation to replenish battery 22. Although not shown, system 10 may also be operated without inverter/charger 28, powered only by the voltage level of battery 22.

When hydrogen levels in storage tanks 14 drop below a pre-set value, system controller 32 will direct voltage from inverter/charger 28 and/or battery 22, to electrolysis cell fluid module 16 and electrolysis cell stack modules 12, while at the same time directing water (or aqueous solution) from fluid module 16 to stack modules 12. If liquid feed water is used, system controller 32 will direct the gases and waste heat generated by the stack modules 12 along with liquid water to the fluid module 16, where the hydrogen gas will be separated out and directed to the hydrogen storage tanks 14 until a pre-set pressure limit or other control limit is reached. Waste heat may be recovered and used to provide local heating or thermal loads. If vapor phase feed water is used, system controller 32 will direct the hydrogen gas generated by the stack modules 12 directly to the hydrogen storage tanks 14 until the pre-set limit is reached.

When electrical power is needed, system controller 32 will direct the hydrogen gas to the fuel cell fluid module 20 for distribution to the fuel cell stack modules 18. The system controller 32 will also simultaneously direct air or oxygen to the fuel cell stack modules 18.

The power generated by the fuel cell stack modules 18 is directed by the system controller 32 to the inverter/charger 28. The inverter/charger 28 may convert variable DC voltages from the fuel cell stack modules 18 to constant or relatively constant voltages and/or invert direct currents to alternating currents, before supplying same to an external load or power grid.

Waste heat generated as a result of fuel cell power production may be vented to the atmosphere, or used to provide local heating or thermal loads.

As noted above, system 10 offers flexibility in terms of system configuration or arrangement. More specifically, the components employed in system 10 can be combined in various configurations to meet the particular needs of an installation and may be, for example, rack-mounted, wall-mounted, or floor mounted.

In a preferred embodiment, the components or modules employed in system 10 are wall-mounted. As will be readily appreciated by one skilled in the art, configuring system 10 as a set of wall-mounted modules connected by standard cables and connectors provides a number of advantages including, but not limited to, the ability to ship the system by way of conventional carriers, providing for easy set-up and installation of the modules by one person and in the same manner as other solar/wind components, as well as the ability to readily access each module for repair or maintenance.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:

1. A modular, regenerative fuel cell system that comprises:
   (a) one or more electrolysis cell fluid modules in fluid communication with (i) a source of water, water vapor, or aqueous solution, (ii) one or more electrolysis cell stack modules, and (iii) means for storing hydrogen gas, and in electrical communication with a power source and control means, for providing water, water vapor, or an aqueous solution to the one or more electrolysis cell stack modules and for delivering hydrogen gas generated by the one or more electrolysis cell stack modules to the means for storing hydrogen gas;
   (b) one or more electrolysis cell stack modules in fluid communication with at least one electrolysis cell fluid module, and in electrical communication with the power source and the control means, each being adapted to convert water, water vapor, or an aqueous solution into at least a hydrogen gas;

(c) one or more fuel cell fluid modules in fluid communication with (i) the means for storing hydrogen gas, (ii) a source of air or oxygen, and (iii) the one or more fuel cell stack modules, and in electrical communication with the power source and the control means, for providing hydrogen gas and air or oxygen to the one or more fuel cell stack modules;

(d) one or more fuel cell stack modules in fluid communication with at least one fuel cell fluid module, and in electrical communication with the power source, an external load or power grid, and the control means, and each being adapted to extract chemical energy from the hydrogen gas and air or oxygen and converting the extracted chemical energy into electrical power;

(e) a power source;

(f) control means; and (g) means for storing hydrogen gas, wherein each stack module is devoid of major fluid systems, and wherein each fluid module comprises one or more pumps, valves, regulators, water/gas phase separation devices, and temperature, pressure and hydrogen sensors.

2. The modular, regenerative fuel cell system of claim 1, wherein the power source comprises one or more batteries.

3. The modular, regenerative fuel cell system of claim 1, wherein the power source comprises means for (i) receiving power from an energy source, (ii) providing power to the one or more electrolysis cell fluid modules, the one or more electrolysis cell stack modules, and the one or more fuel cell fluid modules, and (iii) converting variable power from the one or more fuel cell stack modules to constant or relatively constant voltages and/or inverting direct currents to alternating currents.

4. The modular, regenerative fuel cell system of claim 1, wherein the power source comprises: one or more batteries; and means for (i) receiving power from an energy source, (ii) optionally, charging the one or more batteries, (iii) providing power to the one or more electrolysis cell fluid modules, the one or more electrolysis cell stack modules, and the one or more fuel cell fluid modules, and (iv) converting variable power from the one or more fuel cell stack modules to constant or relatively constant voltages and/or inverting direct currents to alternating currents.

5. The modular, regenerative fuel cell system of claim 1, which further comprises: monitoring means for monitoring information regarding all aspects of the modular regenerative fuel cell system and for communicating the information to the control means.

6. The modular, regenerative fuel cell system of claim 1, wherein the system is selected from the group of modular, regenerative Proton Exchange membrane fuel cell systems, modular, regenerative Solid Oxide fuel cell systems, modular regenerative Alkaline fuel cell systems, modular regenerative Phosphoric Acid fuel cell systems, modular hydrogen-halogen fuel cell systems, and combinations thereof.

7. A modular, regenerative fuel cell system that comprises one or more of each of the following functional modules: electrolysis cell stack modules; electrolysis cell fluid modules; fuel cell stack modules; and fuel cell fluid modules, and means for storing hydrogen gas, wherein each stack module is devoid of major fluid systems, and wherein each fluid module comprises one or more pumps, valves, regulators, water/gas phase separation devices, and temperature, pressure and hydrogen sensors.

8. The modular, regenerative fuel cell system of claim 7, that comprises:

(a) electrolysis cell stack modules, each module consisting essentially of one or more electrolysis cell stacks in fluid communication with an electrolysis cell fluid module, and in electrical communication with power means and control means, each being adapted to convert water or an aqueous solution into at least a hydrogen gas;

(b) a hydrogen gas storage tank;

(c) an electrolysis cell fluid module in fluid communication with (i) a source of water, water vapor, or aqueous solution, (ii) the electrolysis cell stack modules, and (iii) the hydrogen gas storage tank, and in electrical communication with the power means and the control means, for providing water, water vapor, or an aqueous solution to the electrolysis cell stack modules and for delivering hydrogen gas generated by the electrolysis cell stack modules to the hydrogen gas storage tank;

(d) fuel cell stack modules, each module consisting essentially of one or more fuel cell stacks in fluid communication with a fuel cell fluid module, and in electrical communication with the power means, an external load or power grid, and the control means, each being adapted to extract chemical energy from hydrogen gas and air or oxygen and converting the extracted chemical energy into electrical power;

(e) a fuel cell fluid module in fluid communication with (i) the hydrogen gas storage tank, (ii) a source of air or oxygen, and (iii) the fuel cell stack modules, and in electrical communication with power means and the control means, for providing hydrogen gas and air or oxygen to the fuel cell stack modules;

(f) one or more batteries;

(g) power means for (i) receiving power from an energy source, (ii) optionally, charging the one or more batteries, (iii) providing power to the electrolysis cell fluid module, the electrolysis cell stack modules, and the fuel cell fluid module, and (iv) converting variable power from the fuel cell stack modules to constant or relatively constant voltages and/or for inverting direct currents to alternating currents;

(h) monitoring means for monitoring information regarding all aspects of the modular regenerative fuel cell system and for communicating the information to the control means; and (i) control means for receiving information from the monitoring means and for controlling all aspects of the modular regenerative fuel cell system, thereby assuring continuous, uninterrupted system operation.

9. The modular, regenerative fuel cell system of claim 8, wherein the cell stack modules contain membrane electrolysis cells and membrane fuel cells that each comprise an anode, a cathode, an ion exchange membrane disposed between the anode and the cathode, an anode chamber and a cathode chamber.

10. The modular, regenerative fuel cell system of claim 8, wherein the electrolysis cell stack modules are self-pressurizing electrolysis cell stack modules.

11. The modular, regenerative fuel cell system of claim 8, wherein the power means comprises a charge controller with optional maximum power point tracker and/or inverting capability.

12. The modular, regenerative fuel cell system of claim 8, wherein the power means comprises an inverter with optional charging capability.

13. The modular, regenerative fuel cell system of claim 12, wherein the power means comprises a direct current to alternating current inverter/charger.

14. The modular, regenerative fuel cell system of claim 8, wherein the monitoring means comprises monitoring instrumentation, and a communication system.

15. The modular, regenerative fuel cell system of claim 14, wherein the communication system is a high-speed local area network or LAN, and wherein the modular, regenerative fuel cell system interfaces with the LAN network through a wired or wireless LAN interface.

16. The modular, regenerative fuel cell system of claim 14, wherein the communication system comprises Radio Frequency Identification tags.

17. The modular, regenerative fuel cell system of claim 8, wherein the modules are. wall-mounted modules.

18. A method for identifying components of the modular, regenerative fuel cell system of claim 7, the method comprising applying or incorporating an RFID tag to or into one or more components of the modular, regenerative fuel cell system, and arranging for each RFID tag to communicate particular attributes of a component to a system controller.

* * * * *